United States Patent
Heyl et al.

(10) Patent No.: US 12,461,810 B2
(45) Date of Patent: Nov. 4, 2025

(54) METHOD FOR MONITORING IN A DISTRIBUTED SYSTEM

(71) Applicant: Robert Bosch GmbH, Stuttgart (DE)

(72) Inventors: Andreas Heyl, Weil der Stadt (DE); Philipp Mundhenk, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 206 days.

(21) Appl. No.: 18/501,518

(22) Filed: Nov. 3, 2023

(65) Prior Publication Data
US 2024/0159812 A1 May 16, 2024

(30) Foreign Application Priority Data
Nov. 9, 2022 (DE) .................... 10 2022 211 823.5

(51) Int. Cl.
G06F 11/07 (2006.01)
G06F 11/30 (2006.01)
G06F 11/34 (2006.01)
H04L 43/50 (2022.01)

(52) U.S. Cl.
CPC ...... G06F 11/0796 (2013.01); G06F 11/3006 (2013.01); G06F 11/3457 (2013.01); H04L 43/50 (2013.01)

(58) Field of Classification Search
CPC ............ G06F 11/0796; G06F 11/3006; G06F 11/3457; G06F 11/3051; G06F 11/3447; H04L 43/50
See application file for complete search history.

(56) References Cited

U.S. PATENT DOCUMENTS

| | | | |
|---|---|---|---|
| 2015/0179630 A1* | 6/2015 | Chuang | H10D 89/811 361/56 |
| 2019/0004581 A1* | 1/2019 | Borlick | G06F 11/2284 |
| 2019/0095266 A1* | 3/2019 | Chen | G06N 20/00 |

* cited by examiner

Primary Examiner — Jermele M Hollington
Assistant Examiner — Zannatul Ferdous
(74) Attorney, Agent, or Firm — NORTON ROSE FULBRIGHT US LLP

(57) ABSTRACT

A method for monitoring a distributed system, in which a change in a composition of components of the system is provided in an ongoing operation of the system. The method includes: carrying out a component check in which an incompatibility of the components with one another is identified; carrying out an interface check in which an incompatibility of at least one interface between the components is identified. The component check and the interface check in the case of the change in the composition of the components are carried out repeatedly in ongoing operation of the system.

8 Claims, 4 Drawing Sheets

METHOD FOR MONITORING IN A DISTRIBUTED SYSTEM

FIELD

The present invention relates to a method for monitoring in a distributed system. Furthermore, the present invention relates to a computer program and to a device for this purpose.

BACKGROUND INFORMATION

Ensuring correct, reliable, and safe operation is of critical importance in safety-relevant systems. In dedicated systems, integrated self-tests (build-in self-tests, BISTs for short) or self-tests during switching-on (power-on self-tests, POSTs for short) are common. There, the components of the system are checked for correct function and connection. However, such systems generally have little dynamics. These tests therefore focus on the functionality of the components and typically assume a static system at runtime.

With the emerging popularity of reliable distributed systems (RDS for short), systems that are distributed across several nodes and are interconnected by networks, such as WiFi, 5G, Ethernet, etc., are becoming increasingly important and are increasingly used for safety-critical operations. The correctness of the assembly of components (configuration management or variant management) is often only checked on the uppermost layer (i.e., if an application does not work correctly) during operation. Likewise, the correctness of connections is only indirectly checked by the correct operation of the application. However, this is often not sufficient since an application should function correctly and reliably. As a result, safety-critical problems may therefore occur. For example, the insufficiently dimensioned buffer of an Ethernet switch could be too small to handle an additional workload, as a result of which the latency of the communication can have a negative effect on a real-time-critical component through longer queues or even through the dropping of packets.

SUMMARY

The present invention provides a method for monitoring in a distributed system, a computer program, and a device. Features and details of the present invention arise from the disclosure herein. Of course, features and details described in connection with the method according to the present invention also apply in connection with the computer program according to the present invention and the device according to the present invention, and respectively vice versa, so that, with respect to the disclosure, mutual reference to the individual aspects of the present invention is or can always be made.

A method according to the present invention is in particular used for monitoring in a distributed system, in particular in a reliable distributed system (RDS for short), in which a, preferably dynamic, change in a composition of components of the system is provided in an ongoing operation, i.e., at runtime, of the system. For example, the system can comprise the components in the form of nodes in a network in order to carry out data processing via the common computing power of the components. The data processing can be used to provide a safety-critical application, e.g., in a vehicle. The composition of the components can thus correspond to a combination of independent computers presenting themselves to a user or application as a single system. The components can be provided at different geographic locations. It can also be possible for one or more of the components to be provided in a vehicle and for one or more further ones of the components to be provided outside the vehicle.

According to an example embodiment of the present invention, the method can comprise at least one of the following steps, which are preferably performed sequentially and/or at least partly in parallel and/or repeatedly and/or in an automated and/or computer-supported manner:
   carrying out a component check in which an incompatibility of the components with one another is identified, preferably of at least one component newly connected and/or changed in the system;
   carrying out an interface check in which an incompatibility of at least one interface between the components is identified, preferably of at least one interface newly connected and/or changed in the system.

In particular, it is provided that the component check and the interface check in the case of the, preferably every, change in the composition of the components are carried out, preferably repeatedly, in ongoing operation of the system. In this way, the present invention can help to ensure the correctness of the system composition. This is done, for example, by checking all components connected in the system, during the component check, for example on the basis of a component identifier (hereinafter also referred to as an identifier), technical capabilities (which are, for example, specified by technical specifications), etc. The component check and the interface check can be carried out in conjunction with a compatibility database, which is, for example, hosted in a cloud.

The change in the composition of the components can comprise, for example, a change in the number of components and/or an addition of at least one component and/or a removal of at least one component and/or a failure of at least one component and/or a defect of at least one component. The performance of the component check and/or the interface check can be triggered, for example, by the change in the composition and/or can be carried out repeatedly in order to detect the change in the composition.

According to an example embodiment of the present invention, advantageously, the component check and/or the interface check can be carried out across the boundaries of the system and/or the components. This means, for example, that the component check identifies an incompatibility of those components with one another that form different nodes in a network and/or have different processors and/or memories and/or are connected to one another via the interfaces.

For example, it can be provided that the component check and the interface check are additionally carried out during start of operation of the system, wherein the start of operation initiates the ongoing operation in which data are transmitted between the components via the at least one interface, preferably at least one network interface, in order to provide a safety-critical function in a vehicle. In this case, the components can each form a node in a network in order to jointly provide the safety-critical function. The safety-critical function can, for example, be a function of a real-time-critical component of the vehicle, e.g., a brake, preferably an emergency brake, of the vehicle.

According to an example embodiment of the present invention, it is optionally also possible that carrying out the component check and the interface check is triggered by the change in the composition of the components in order to identify an incompatibility resulting from the change. In other words, the component check and the interface check can be triggered by changed (i.e., added and removed) connections of the components in the system. It is possible that the component check and the interface check are additionally triggered by a startup of the system.

According to an example embodiment of the present invention, it can furthermore be possible that carrying out a component check comprises the following steps, which are preferably performed sequentially:

acquiring at least one component specification of at least one of the components, wherein the component specification preferably comprises an identifier and/or a capacity and/or a version and/or another technical specification of the at least one component;

verifying the at least one component by checking the at least one acquired component specification on the basis of a compatibility database and/or on the basis of a digital twin of the component and/or on the basis of a simulation of the component with the component specification;

identifying the incompatibility of the at least one component on the basis of the verification.

The compatibility database can, for example, be provided in a cloud in order to enable access from any location. Furthermore, it can be possible for the steps to be carried out by one of the components itself. Thus, the component check can also be provided by one or more of the components. At least one item of information as to which combinations of components cause incompatibilities can be stored in the compatibility database, for example.

According to an example embodiment of the present invention, it is furthermore possible that carrying out the interface check comprises the following step:

carrying out at least one active test in which data are transmitted, preferably end-to-end, between at least two of the interfaces, and a latency measurement is preferably carried out based on the data transmission.

In other words, carrying out active tests end-to-end via the interfaces of the components can be provided in the present invention. Such tests can comprise, for example, a measurement of the round-trip latency in order to ensure sufficient power of the system. This is also carried out, for example, during startup, i.e., start of operation, of the system.

Furthermore, according to an example embodiment of the present invention, it is optionally possible within the framework of the present invention that carrying out the interface check comprises the following steps:

acquiring at least one interface specification of at least one of the interfaces, wherein the interface specification preferably comprises an identifier and/or a data rate and/or another technical specification of the at least one interface, verifying the at least one interface by checking the at least one acquired interface specification on the basis of a compatibility database and/or on the basis of a digital twin of the interface and/or on the basis of a simulation of the interface with the interface specification, identifying the incompatibility of the at least one interface on the basis of the verification.

The compatibility database can, for example, be provided in a cloud in order to enable access from any location. Furthermore, it can be possible for the steps to be carried out by one of the components itself. Thus, the interface check can also be provided by one or more of the components. At least one item of information as to which interface specification causes incompatibility in the system can, for example, be stored in the compatibility database.

Furthermore advantageously, according to an example embodiment of the present invention, it can be provided that in carrying out the component check and/or the interface check, at least one further predefined requirement for at least one of the components and/or the interfaces is checked in addition to a compatibility. The requirement can, for example, be a technical requirement for a power and/or capacity, such as storage capacity, and/or for a transmission rate.

A further advantage within the framework of the present invention can be achieved if monitoring of transmitted data of applications performed by the components of the system is carried out. For this purpose, the system can comprise a passive monitoring component that monitors the data transmitted by applications and, for example, detects increased latencies and/or a reduced bandwidth and/or a reduced throughput, without actively feeding data into the system. Furthermore, it is possible that the data are actively injected in order to preferably carry out a latency measurement. The latency measurement can be used to identify the incompatibility in the form of an insufficiently dimensioned buffer of the at least one interface, for example. In this way, overloading of the interface can be prevented. For example, the insufficiently dimensioned buffer of one of the interfaces in the form of an Ethernet switch can be too small to handle an additional workload, as a result of which the latency of the communication can have a negative effect on a real-time-critical component through longer queues or even through the dropping of packets.

Furthermore protected is a device for data processing that is designed to perform the method according to the present invention.

The present invention also relates to a computer program, in particular a computer program product, comprising instructions that, when the computer program is executed by a computer, cause the computer to perform the method according to the present invention. Thus, the computer program according to the present invention offers the same advantages as have been described in detail with reference to a method according to the present invention.

The data processing device that executes the computer program can be provided as the computer, for example. The computer can comprise at least one processor for executing the computer program. A non-volatile data memory can also be provided, in which the computer program can be stored and from which the computer program can be read by the processor for execution.

An object of the present invention can also be a computer-readable storage medium comprising the computer program according to the present invention. The storage medium is, for example, designed as a data store, such as a hard drive and/or a non-volatile memory and/or a memory card. The storage medium can, for example, be integrated into the computer.

Moreover, the method according to the present invention can also be designed as a computer-implemented method.

Further advantages, features and details of the present invention arise from the following description, in which exemplary embodiments of the present invention are described in detail with reference to the figures. The features disclosed herein can be essential to the present invention individually or in any combination.

DETAILED DESCRIPTION OF EXAMPLE EMBODIMENTS

In the following figures, identical reference signs are used for the same technical features even of different exemplary embodiments.

The present invention is based in particular on the problem that dynamic distributed systems, in particular reliable distributed systems (RDS for short) exist in various forms, change at runtime and have a series of interfaces with one another. The composition and functionality of the interfaces must be monitored in order to ensure correct and safe behavior. A solution should therefore in particular be provided that can ensure correct (in the sense of safety) and safe (in the sense of security) behavior.

Figure 1:
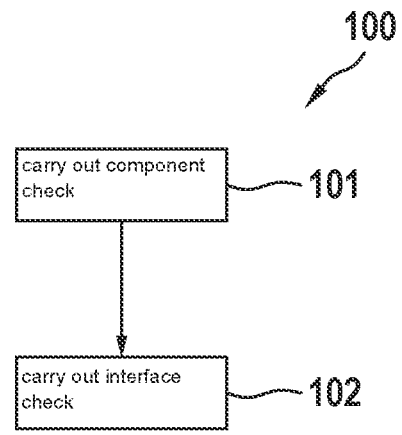
FIG. 1 shows method steps, a computer program, and a device according to exemplary embodiments of the present invention.
Figure 1:
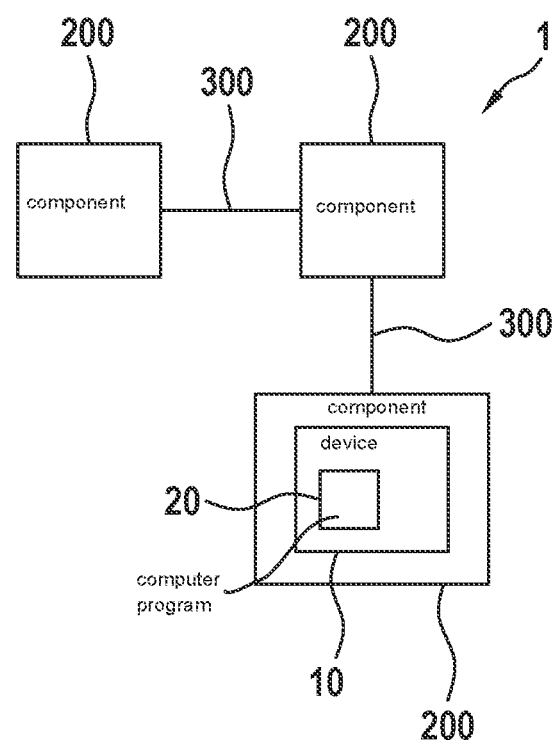
Figure 2:
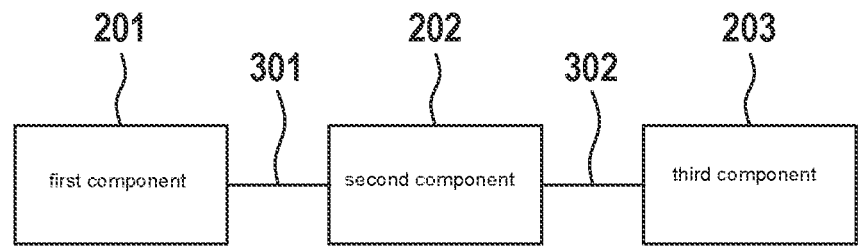
FIG. 2 shows an exemplary system model in which three components with interfaces are provided, according to example embodiments of the present invention.

FIG. 1 schematically shows a distributed system 1 as well as a method 100 according to an embodiment variant of the present invention. In this case, the method 100 is used for monitoring in the distributed system 1, in which a, in particular dynamic, change in a composition of components 200 of the system 1 is provided in an ongoing operation of the system 1. The change is, for example, an addition of a component 200, such as a rack blade, to the system 1.

According to a first method step 101, carrying out a component check can be provided, in which an incompatibility of the components 200 with one another is identified. Furthermore, according to a second method step 102, it can be possible to carry out an interface check, in which an incompatibility of at least one interface 300 between the components 200 is identified. The component check and the interface check in the case of the change in the composition of the components 200 can be carried out repeatedly in ongoing operation of the system 1. Moreover, the component check and the interface check can be carried out additionally during start of operation of the system 1. The start of operation can also be referred to as the startup of the system 1, in which ongoing operation is initiated. In ongoing operation, data transmission between the components 200 via the at least one interface 300 can be provided in order to provide a safety-critical function in a vehicle not explicitly shown. Carrying out 101, 102 the component check and the interface check can also be triggered by the change in the composition of the components 200 in order to identify an incompatibility resulting from the change.

The method 100 can in this way check a correct composition and compatibility of components 200 of the system 1 and a functionality of associated interfaces 300. This is enabled, for example, by a verification of the configuration at startup, e.g., of a rack computer and/or of an RDS. Furthermore, an analysis of the interfaces 300 at the startup of the system 1 (e.g., by safety & security POST and/or BIST), a passive monitoring of the system 1 in operation, a verification of the configuration during changes in the system 1, e.g., by adding components 200, such as a rack blade, and an analysis of the interfaces 300 in the case of changes in the system 1 can be provided in the method 100. POST stands for power-on self-test and BIST stands for built-in self-test.

In an exemplary embodiment of the present invention, three phases can be provided, which are carried out on two levels of the system 1. The three phases can comprise: A startup phase, a connection establishment phase and an operation phase. The levels of the system 1 can comprise: a component composition level and an interfaces level.

In the startup phase, it can be checked on the component composition level whether the connected components 200 are correct. The component check and/or interface check can in this case be performed by the components 200 themselves. For example, in a rack-mounted embedded computer system, the components 200 can verify other components 200 in the system 1 independently of one another. As part of the checks, version conflicts in the software of the components 200 can also be recognized and corresponding countermeasures (typically disconnection or shutdown) can be initiated. For safety-critical functions, it can be checked whether the integrity of all components 200 used corresponds to the required integrity of the function (e.g., ASIL). Such a check of the composition can be based on the capabilities of the components 200 (e.g., in the form of a machine-readable safety manual or security manual, in which the capabilities and the requirements for the operating conditions are specified, e.g., in the form of definitions defined by assumptions and warranties) that are communicated during the startup phase (discovery). Likewise, the check can also be supported by a database (hosted in the cloud, for example) of compatible components (whitelist, blacklist) or by a digital twin that is capable of carrying out simulations of the RDS for validation.

In the startup phase, an interface check, preferably in the form of an end-to-end check, can furthermore be performed at the interfaces level. Even if the components 200 are generally compatible, during switching-on, the system 1 can impose requirements for the interfaces 300 and other components 200 of the system 1 (e.g., again defined in a machine-readable safety manual or security manual), which requirements might not be met. For example, a component with a 100 Mbit/s Ethernet port as an interface can generally communicate with a component that has an Ethernet switch with an auto-negotiation function of 1 Gbit/s as an interface. However, problems, such as an overload in the buffer of the switch, which, for example, leads to increased latency, can in this case arise and may be safety-critical depending on the application. The configuration can therefore be checked end-to-end before communication is established and data are sent at rates greater than 100 Mbit/s. In such cases, the requirements for (parts) of the system 1 are not met, and the system 1 cannot continue to start up. This check can again be supported by a database or by a digital twin (e.g., in the cloud).

In the connection establishment phase, a check of the configurations of the system 1 can be provided at the component composition level. In an RDS, the components 200 change at runtime. New configurations of the system 1 are therefore created at runtime. Similarly to the startup phase, it can be useful to verify such configurations before they can be used for safety-critical (safety-critical or security-critical) functions. This is to avoid situations, for example, in which the use of a component 200 with version 1 of a middleware and of another component 200 with version 2 of a middleware results in a crash due to the version difference. Although the two versions may be compatible in general, they can result in a later crash of a safety-critical application when a function of the middleware version 2 is used that is not available in version 1. New configurations can, for example, be checked by online diagnosis (e.g., by sending a test sample and evaluating the response of the system 1) or by simulations (e.g., fuzz testing) in a digital twin of the relevant RDS configuration in the backend.

In the connection establishment phase, an interface check can be provided at the interfaces level. As in the startup phase, i.e., during system startup, it can be useful to check the interfaces 300 at the time of connection since, for example, the new connection of a component 200 to a system 1 could overload the existing components 200, for example by generating too much traffic on a backbone network.

In the operation phase, the components 200 can be monitored at the component composition level. During operation, a component 200 can decouple from the RDS, which in turn affects the safety of the overall system. If, for example, a component 200 that is currently hosting a safety monitor or an intrusion detection system 1 is decoupled, the safety or security is at risk. Countermeasures can then be taken. This could include shutting down safety-critical functions and/or taking further safety measures.

In the operation phase, monitoring of the interfaces 300 can be provided at the interfaces level. During operation, the dynamics of the system 1 can affect the behavior of the interfaces 300. For example, if a (faulty/defective) Ethernet or CAN component 200 causes a short circuit on the communication wires, such a short circuit can interrupt all communications via this interface 300. Suitable countermeasures should be taken immediately at this time.

FIG. 1 furthermore shows a computer program 20 and a device 10, which can be designed to perform the method steps 101, 102 and/or to provide the above-described checks in the startup phase, the connection establishment phase and the operation phase.

Figure 3:
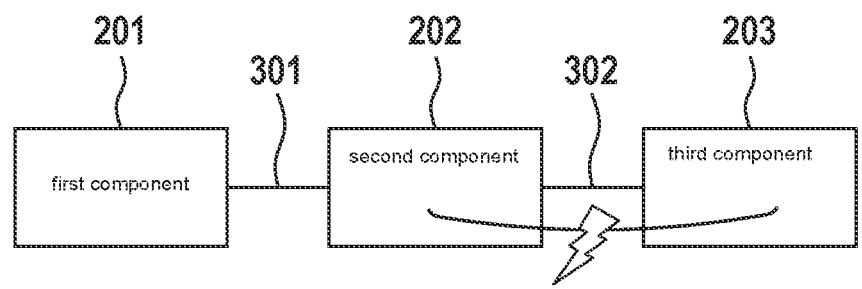
FIGS. 3 and 4 show examples of interface verification and version verification, according to example embodiments of the present invention.
Figure 4:
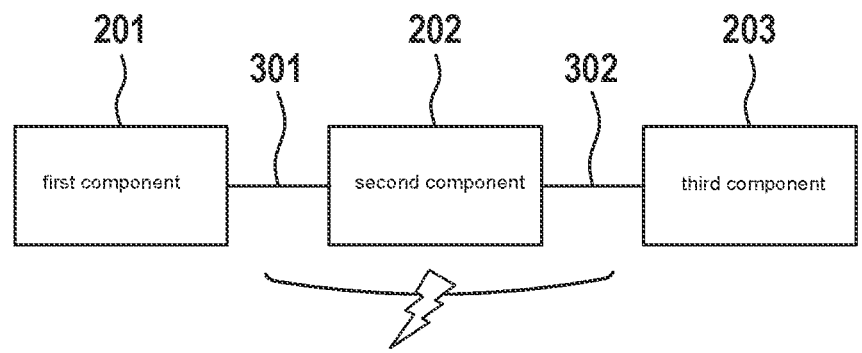

FIGS. 2 to 5 comprise exemplary representations of the system 1, in which a first component 201, a second component 202, and a third component 203 are in data communication with one another via at least a first interface 301 and a second interface 302. FIG. 3 shows that incompatibility can be present due to a version difference between the second component 202 and the third component 203. FIG. 4 shows, by way of example, that incompatibility between interfaces 300 can, for example, be present due to a different data rate. The first interface 301 can, for example, support a maximum data rate of 100 Mbit/s and the second interface 302 can support a minimum data rate of 1 Gbit/s. Such incompatibilities can, for example, be identified by means of a database and/or a simulation of the components 200 or interfaces 300.

Figure 5:
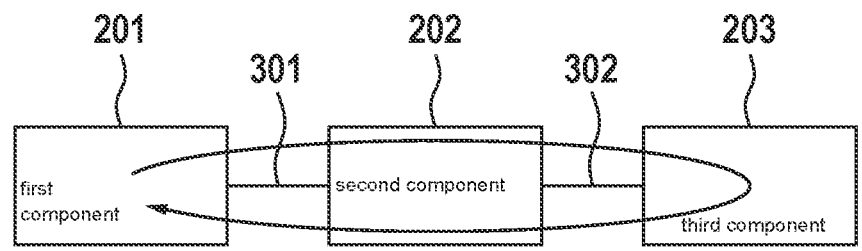
FIG. 5 shows an exemplary active test, for example for latency measurement, according to an example embodiment of the present invention.

A further option for identifying incompatibilities is shown in FIG. 5. In this case, carrying out 102 the interface check comprises carrying out at least one active test in which data are transmitted, preferably end-to-end, between at least two of the interfaces 301, 302, and a latency measurement is preferably carried out based on the data transmission. For this purpose, the data may be injected in order to carry out the latency measurement.

Figure 6:
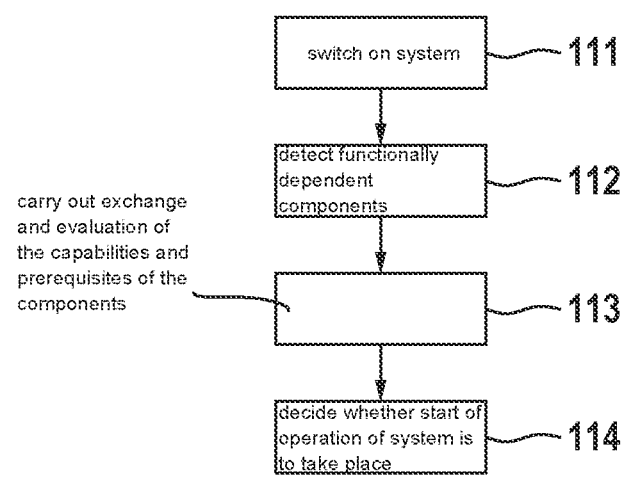
FIG. 6 shows an exemplary startup process of the system, according to the present invention.

FIG. 6 shows further method steps, which may be performed at a startup of the system 1. In such a switching-on procedure, after switching-on 111 the system 1, detection 112 of functionally dependent components in the system 1 can be carried out first. Subsequently, an exchange and an evaluation of the capability and prerequisites of the components can be carried out 113, i.e., component specifications and/or interface specifications can in particular be acquired. Subsequently, it can be decided 114 whether the start of operation of the system 1 is to take place based on the check on the basis of the acquired specifications.

Figure 7:
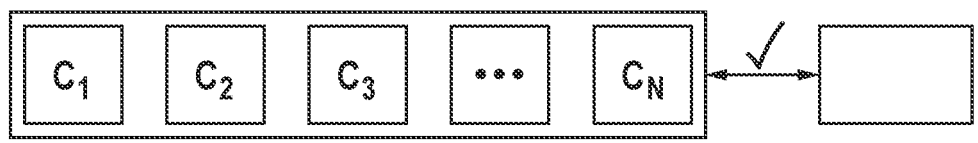
FIG. 7 shows a variant in which a component itself carries out the monitoring, according to the present invention.
Figure 8:
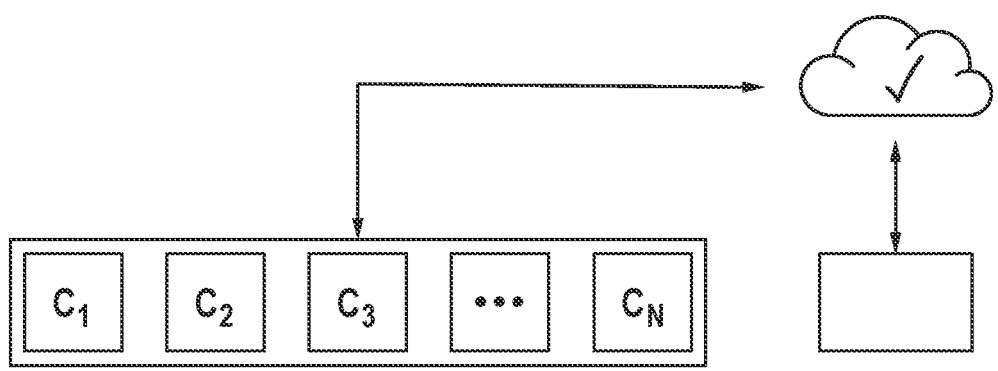
FIG. 8 shows a variant in which a backend carries out the monitoring, according to the present invention.

FIG. 7 shows that the component check and/or the interface check, which can also be referred to as automatic compatibility check, can be carried out by the components 200 themselves. For this purpose, the component 200 can, for example, read and evaluate specifications $c_1$-$c_N$. According to FIG. 8, the automatic compatibility check can also be performed in a backend. If the compatibility check shows that an incompatibility exists, the error response can in general be to prevent inclusion of the respective component 200 and/or interface 300 or to disconnect the component 200 and/or interface 300. It is also possible that, as a dedicated error response, individual or only safety/security-relevant functionalities are deactivated in a targeted manner if an incompatibility is identified.

The above description of the exemplary embodiments describes the present invention solely in the context of examples. Of course, individual features of the embodiments can be freely combined with one another, if technically useful, without leaving the scope of the present invention.

The invention claimed is:

1. A method for monitoring in a distributed system, in which a change in a composition of components of the system is provided in an ongoing operation of the system, the method comprising the following steps:
   carrying out a component check in which an incompatibility of the components with one another is identified; and
   carrying out an interface check in which an incompatibility of at least one interface between the components is identified;
   wherein the component check and the interface check are carried out repeatedly during the ongoing operation of the system when the composition of the components of the system changes
   wherein the carrying out of the component check includes the following steps:
      acquiring at least one component specification of at least one of the components, wherein the component specification includes an identifier and/or a capacity and/or a version and/or another technical specification of the at least one of the components;
      verifying the at least one of the components by checking the at least one acquired component specification based on a compatibility database and/or based on a digital twin of the at least one component and/or based on a simulation of the at least one of the components, with the component specification; identifying the incompatibility of the at least one of the components based on the verification;
   wherein the carrying out of the interface check includes the following steps:
      acquiring at least one interface specification of at least one of the interfaces, wherein the interface specification includes an identifier and/or a data rate and/or another technical specification of the at least one interface;
      verifying the at least one interface by checking the at least one acquired interface specification based on a compatibility database and/or based on a digital twin of the at least one of the interfaces and/or based on a simulation of the at least one of the interfaces, with the interface specification;

identifying the incompatibility of the at least one of the interfaces based on the verification.

2. The method according to claim 1, wherein the component check and the interface check are additionally carried out during a start of operation of the system, wherein the start of operation initiates the ongoing operation in which data are transmitted between the components via the at least one interface to provide a safety-critical function in a vehicle.

3. The method according to claim 1, wherein the carrying out of the component check and the carrying out of the interface check are triggered by the change in the composition of the components of the system to identify an incompatibility resulting from the change.

4. The method according to claim 1, wherein the carrying out of the interface check includes the following step:

carrying out at least one active test in which data are transmitted between at least two of the interfaces, and a latency measurement is carried out based on the data transmission.

5. The method according to claim 1, wherein, in carrying out the component check and/or the interface check, at least one further predefined requirement for at least one of the components and/or at least one of the interfaces is checked in addition to a compatibility.

6. The method according to claim 1, wherein monitoring of transmitted data of applications performed by the components of the system is carried out, wherein the data being injected to carry out a latency measurement.

7. A non-transitory computer-readable medium on which is stored a computer program including instructions for monitoring in a distributed system, in which a change in a composition of components of the system is provided in an ongoing operation of the system, the instructions, when executed by a computer, causing the computer to perform the following steps:

carrying out a component check in which an incompatibility of the components with one another is identified; and carrying out an interface check in which an incompatibility of at least one interface between the components is identified;

wherein the component check and the interface check are carried out repeatedly during the ongoing operation of the system when the composition of the components of the system changes wherein the carrying out of the component check includes the following steps:

acquiring at least one component specification of at least one of the components, wherein the component specification includes an identifier and/or a capacity and/or a version and/or another technical specification of the at least one of the components;

verifying the at least one of the components by checking the at least one acquired component specification based on a compatibility database and/or based on a digital twin of the at least one component and/or based on a simulation of the at least one of the components, with the component specification;

identifying the incompatibility of the at least one of the components based on the verification;

wherein the carrying out of the interface check includes the following steps:

acquiring at least one interface specification of at least one of the interfaces, wherein the interface specification includes an identifier and/or a data rate and/or another technical specification of the at least one interface;

verifying the at least one interface by checking the at least one acquired interface specification based on a compatibility database and/or based on a digital twin of the at least one of the interfaces and/or based on a simulation of the at least one of the interfaces, with the interface specification;

identifying the incompatibility of the at least one of the interfaces based on the verification.

8. A device for data processing, the device configured to monitor in a distributed system, in which a change in a composition of components of the system is provided in an ongoing operation of the system, the device configured to:

carry out a component check in which an incompatibility of the components with one another is identified; and carry out an interface check in which an incompatibility of at least one interface between the components is identified;

wherein the component check and the interface check are carried out repeatedly during the ongoing operation of the system when the composition of the components of the system changes wherein the carry out of the component check includes the following steps:

acquiring at least one component specification of at least one of the components, wherein the component specification includes an identifier and/or a capacity and/or a version and/or another technical specification of the at least one of the components;

verifying the at least one of the components by checking the at least one acquired component specification based on a compatibility database and/or based on a digital twin of the at least one component and/or based on a simulation of the at least one of the components, with the component specification;

identifying the incompatibility of the at least one of the components based on the verification;

wherein the carry out of the interface check includes the following steps:

acquiring at least one interface specification of at least one of the interfaces, wherein the interface specification includes an identifier and/or a data rate and/or another technical specification of the at least one interface;

verifying the at least one interface by checking the at least one acquired interface specification based on a compatibility database and/or based on a digital twin of the at least one of the interfaces and/or based on a simulation of the at least one of the interfaces, with the interface specification;

identifying the incompatibility of the at least one of the interfaces based on the verification.

\* \* \* \* \*